United States Patent [19]

Laird

[11] 4,037,988
[45] July 26, 1977

[54] FLEXURE HAVING PITCH FLAP COUPLING

[75] Inventor: George William Laird, Greenville, Del.

[73] Assignee: The Boeing Company, Seattle, Wash.

[21] Appl. No.: 684,935

[22] Filed: May 10, 1976

Related U.S. Application Data

[63] Continuation-in-part of Ser. No. 526,994, Nov. 25, 1974, abandoned.

[51] Int. Cl.² .............................................. B64C 27/44
[52] U.S. Cl. ................................. 416/141; 416/134 A; 416/226; 416/230; 416/241 A; 416/132 A
[58] Field of Search .................... 416/134, 134 A, 229, 416/230, 104, 140, 141, 226, 241 A

[56] References Cited

U.S. PATENT DOCUMENTS

| | | | |
|---|---|---|---|
| 3,232,349 | 2/1966 | Ballauer | 416/141 |
| 3,237,697 | 3/1966 | Ford et al. | 416/229 X |
| 3,310,117 | 3/1967 | Slivinsky et al. | 416/226 |
| 3,484,174 | 12/1969 | McCoubrey | 416/132 |
| 3,528,753 | 9/1970 | Dutton et al. | 416/226 |
| 3,552,881 | 1/1971 | Rogers et al. | 416/226 X |
| 3,669,566 | 6/1972 | Bourquardez et al. | 416/134 A |
| 3,713,753 | 1/1973 | Brunsch | 416/226 |
| 3,874,820 | 4/1975 | Fenaughty | 416/226 |
| 3,926,536 | 12/1975 | Ciastula et al. | 416/141 X |
| 3,999,886 | 12/1976 | Ormiston et al. | 416/138 X |

Primary Examiner—Everette A. Powell, Jr.
Attorney, Agent, or Firm—Paul & Paul

[57] ABSTRACT

A flexure for connecting the root end of a rotor end of a rotor blade to a rotor hub in a bearingless rotor assembly. The flexure inherently induces a change in pitch angle in accordance with a change in flap angle. The flexure, which may form an integral portion of the rotor blade, is constructed of a composite material made of fibers secured to one another by a bonding agent. The fibers are arranged in two sets. The variation of the blade pitch angle in accordance with the blade flap angle is accomplished by either varying the number of fibers between the two sets or varying the angle of each set to the longitudinal axis of the flexure, or both.

4 Claims, 4 Drawing Figures

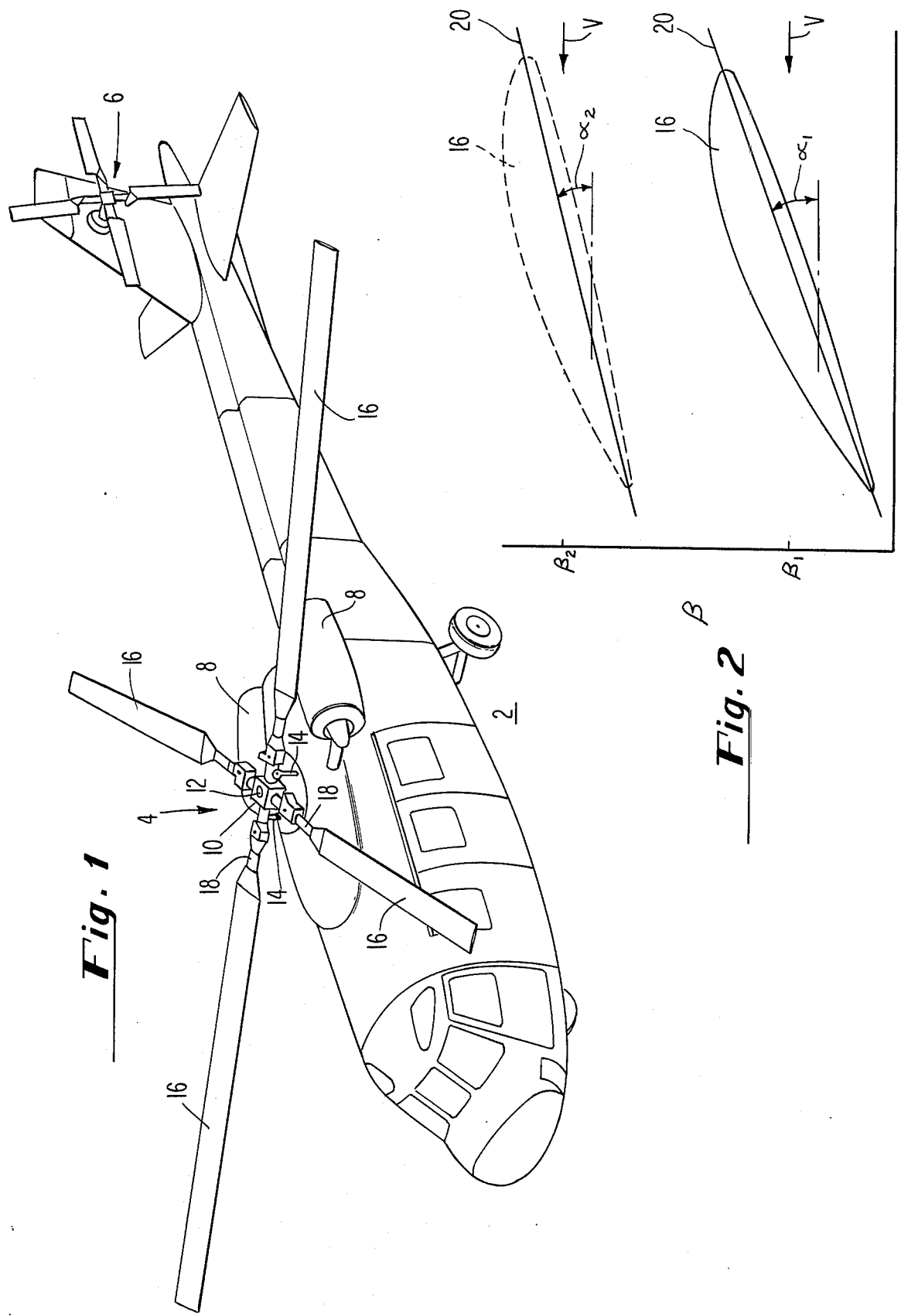

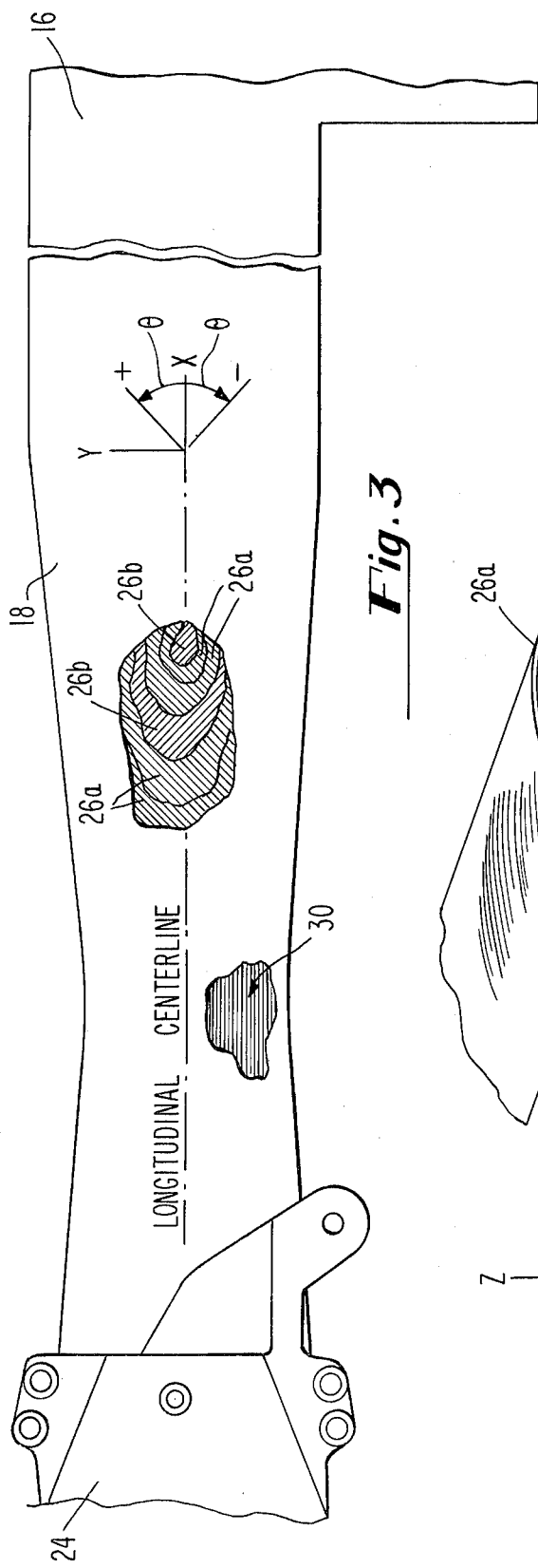
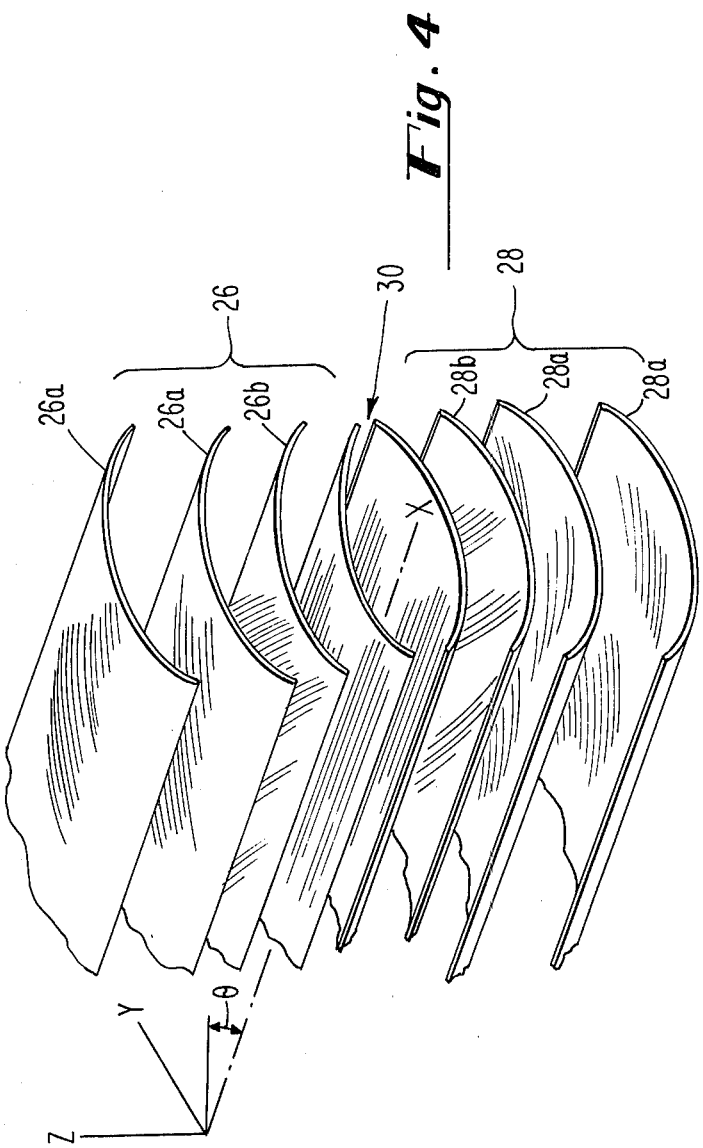

FLEXURE HAVING PITCH FLAP COUPLING

REFERENCE TO EARLIER APPLICATION

This application is a continuation-in-part application of co-pending application Ser. No. 526,994, filed Nov. 25, 1974, now abandoned.

BACKGROUND OF THE INVENTION

This invention relates to flexures in general and flexures used to connect rotor blades to the rotor of a rotorcraft such as helicopter, in particular.

It has long been recognized that it is desirable to couple pitch motions of a helicopter rotor blade to flap motions of the blade. The flap angle of a rotor blade is defined as the angle between the rotor blade and the plane of rotation of the rotor. The flap angle is positive in an upward direction and is a direct function of the amount of lift the blade generates. The blade pitch angle of attack is the angle between the free-stream air velocity vector and the rotor blade chord plane. The pitch angle is positive when the leading edge of the rotor blade is pitched upward. Rotor blade lift increases with increasing pitch angle until aerodynamic stall is reached.

Without the use of the present invention or some other device which will achieve the same affect, an increase in pitch angle will produce an increase in flap angle. This results from the fact that the greater lift which results from the increase in the pitch angle forces the blade flap angle to increase. In rotors of the bearingless type, high flap angles are particularly undesirable due to the high stress levels which are accordingly induced in the root ends of the rotor blades. This positive coupling of rotor blade flap angles to the blade pitch angle also causes stability and control problems for the aircraft.

Most helicopters of the prior art have used articulated rotors. Articulated rotor systems are rotors wherein the rotor blade is hinged to the rotor hub. These discrete hinges have usually been provided by hinge pins or the like. Flap hinges are provided so that the rotor blades may flap in and out of the plane of rotation. A lead lag hinge is provided so that the rotor may move to and fro in the plane of rotation. Additionally, bearings are provided which permit the rotor blade to pitch about its longitudinal axis. With advances in technology rotor systems are presently being made without such bearings. In a bearingless rotor system the discrete flap and lead lag hinges of the articulated rotor system are eliminated. The flapping and lead lag motions occur, but do so as a result of elastic deformation of the blade, or flexure.

It has been common to design articulated helicopter rotor systems such that there is negative coupling between the pitch and flap angles. Negative coupling causes the blade pitch angle to decrease with an increase in flap angle. The reduction of blade pitch decreases the amount of lift generated by the blades thus permitting the flap angles to decrease. Negative coupling thus avoids the problems of high stress levels at the root ends of the rotor blades and decreases stability and control problems of the aircraft. The achievement of negative pitch flap coupling has been a problem with the advent of bearingless rotor systems.

SUMMARY OF THE INVENTION

The present invention achieves negative pitch flap coupling in rotor blades of the bearingless type. The invention is a flexure which connects the rotor blade to the rotor hub. The flexure, and in some instances the rotor blade, is made of a composite material comprised of a fibrous material such as fiber glass, graphite, or boron, embedded in a bonding material. The flexure may or may not form an integral portion of the rotor blade.

The flexture includes separate sets of fibers. Pitch flap coupling is achieved by having unequal numbers of fibers in certain sets, or by constructing the flexure such that the angle between the fibers and a plane perpendicular to the plane of rotation of the blade and passing through the longitudinal centerline of th flexure is different for each set of fibers. Of course, pitch flap coupling may be achieved by using both different angles and different numbers of fibers.

It is therefore an object of the invention to provide a flexure which will vary its pitch angle in accordance with its flap angle.

It is an additional object of the invention to provide a flexure having a negative coupling between pitch angle and flap angle wherein an increase in flap angle will result in a decrease in pitch angle.

BRIEF DESCRIPTION OF THE DRAWINGS

FIG. 1 is a perspective view of a helicopter having a bearingless rotor hub embodying the flexure of the present invention.

FIG. 2 is a schematic view of a rotor blade showing the relationship between pitch angle and flap angle.

FIG. 3 is a plan view of the flexure shown in FIG. 1 establishing an XY reference plane.

FIG. 4 is a schematic view showing the layers of composite material which make up the flexure of the present invention, establishing an XYZ cartesian reference.

DESCRIPTION OF THE PREFERRED EMBODIMENT

FIG. 1 shows a helicopter 2 having a main lifting rotor 4, an anti-torque rotor 6, and engines 8. The rotor 4 includes a hub 10, a rotor shaft 12, pitch links 14 and blades 16. The blades are secured to the hub 10 by the flexures 18 of the present invention. During operation of the helicopter the engines 8 drive the rotor shaft 12 to rotate the hub 10, the flexures 18, and the blades 16. The helicopter is controlled in part by changing the pitch of the rotor blades 16. Operation of the appropriate cockpit controls results in axial movement of the pitch links 14 which causes the blades to pitch about a pitch axis and pitch bearings which are not shown.

Reference will now be made to FIG. 2 which shows schematically negative pitch flap coupling which the present invention effects. An end view of a rotor blade 16 is shown at an angle of attack. For porposes of this disclosure the angle of attack $\alpha$ is defined as that angle between the free stream air velocity vector V and the chordline 20 of an airfoil section of the rotor blade 16.

The rotor flap angle $\beta$ is defined as the angle between the rotor chord plane and the plane of rotation. For a particular angle of attack $\alpha_1$ the rotor blade is at a particular flap angle $\beta_1$. As the blade flap angle increases to $\beta_2$ the flexure of the present invention causes the angle of attack to decrease to $\alpha_2$. As previously indicated, this has the effect of reducing the lift generated by the blade thus permitting the flap to decrease to $\beta_1$.

Reference will now be made to FIGS. 3 and 4 which show an embodiment of the invention.

A root end fitting 24 is connected to one end of the flexure 18 so that the flexure may be connected to the rotor hub 10. The rotor blade 16 is connected to the opposite end of the flexure. Though the actual configuration of the flexure may vary, dependent upon desired design characteristics, the longitudinal centerline of the flexure will be substantially as illustrated in FIG. 3. The longitudinal centerline of the flexure passes through the center of the root end and the blade end of the flexure. In the preferred embodiment of the invention the flexure and blade are integrally connected to one another and formed as one piece. However, it is to be understood that the flexure may be assembled as an independent part and connected to the blade by appropriate means.

The flexure is a composite structure. Composite structures are generally defined as structures being made of two or more distinct materials wherein a primary, generally fibrous, material is held together by a bonding agent. The present invention is made of glass fibers connected to one another by an epoxy resin. Glass fibers arranged in sheets preimpregnated with uncured epoxy resin are commercially available as SP250-SF1, which is manufactured by the 3-M Company.

The flexure 18 is made of groups of fibers, including an upper-crossply group 26, a lower-crossply group 28, and unidirectional groups 30. The unidirectional fibers of groups 30, which are parallel to the flexure centerline, provide axial strength. The negative pitch flap coupling achieved by the flexure of the present invention is the direct result of the number of angular relationship of the fibers within the upper and lower crossply groups 26 and 28.

A schematic view of these fibers is shown in FIG. 4. A cartesian coordinate system is shown in FIGS. 3 and 4. The X axis is parallel to the flexure centerline; and Y axis is parallel to the blade chord line and the Z axis is perpendicular to both. All the fibers in groups 26 and 28 are crossply. By crossply it is meant that the fibers are at an acute angle $\theta$, to the X axis in the XY plane, as shown in FIG. 3.

Group 26 and 28 are made up of layers or sheets of fibers. All the fibers in a particular sheet have the same angular relationship. Those sheets in the upper crossply group 26 which have fibers at a positive angle, are identified as sheets 26a while those sheets which have fibers at a negative angle, are identified as 26b. The same sign convention applies to those sheets in the lower crossply group 28 in that sheets 28a, have fibers at a positive angle, while sheets 28b have fibers at a negative angle.

For purpose of this disclosure, all the fibers at a positive angle shall be identified as the "positive set" while all the fibers at a negative angle shall be identified as the "negative set". FIG. 3 illustrates a reference orientation for a positive and a negative angle $\theta$. Thus the positive set consists of the sum of all the fibers 26a and 28a, and the negative sets consists of the sum of all the fibers 26b and 28b.

Negative pitch flap coupling may be achieved in the present invention by having a greater number of fibers in the positive set compared to the negative set. Negative pitch flap coupling may also be achieved when there are the same number of fibers in the positive and negative sets by making the absolute value of the angle of the negative set greater than the absolute valve of the angle of the positive set. Of course, both approaches may be combined.

In the preferred embodiment of the invention the negative coupling is achieved by having a greater number of fibers in the positive set. This is achieved in both upper crossply group 26 and lower crossply group 28 by having two sheets 26a and 28a followed by a single sheet of fibers 26b and 28b respectively. The absolute value of the angle $\theta$ in each set is the same, 45°. This is the orientation shown in FIG. 4. This is also shown in the cut-away portion of FIG. 3 showing sheets 26a and 26b. The other cut-away portion of FIG. 3 illustrates the orientation of the unidirectional fibers of group 30.

The orientation of fibers illustrated in FIG. 3 provides a decrease in pitch angle of approximately 0.5° for an increase in flap angle of 10° or put another way, a negative pitch flap coupling ratio of 0.05 is provided. The relationship is substantially linear as long as the strain of the flexure is within the elastic range of the material.

The magnitude of the coupling ratio may be varied by changing the ratio of positive fibers or by changing either the positive or negative angle, or both. The magnitude is also a function of the proportion of unidirectional fibers to the total number of crossply fibers and the cross sectional shape of the flexure. As will be readily appreciated by those skilled in the art, the magnitude of the negative pitch flap ratio may be calculated with reasonable accuracy for a given design, if it is a very simple structure. For many applications testing will be required prior to a final design in order to be assured that the design ratio has been achieved.

The negative pitch flap ratio, for a flexure having a constant cross section, is independent of the flexure length. If the length of a particular flexure were decreased by half, the same change in pitch angle could be obtained by flapping or bending the flexure twice as much. However, the length of the flexure does determine the maximum degree of pitch change obtainable by a particular flexure.

The total number of sheets in each group 26 and 28 will vary according to the design of the particular structure. Of course, the design is dependent upon the type of helicopter the flexure will be used in conjunction with. For ease in manufacture the upper crossply group 26 and lower crossply group 28 are laid up as separate units. The upper and lower groups are then placed in a mold with the unidirectional groups 30 and cured.

Although the blade itself has crossply fibers, the crossply fibers which form the flexure 18 of the present invention only extend through the flexure. In fact, the number of fibers decrease with the length of the flexure. That is, the number of sheets of fibers decrease from a maximum at the hub end of the flexure to a minimum at the blade end of the flexure. In order to preserve the negative cross coupling feature of the invention, three sheets terminate at the same point the flexure span. Thus, two sheets 26a and one sheet 26b are terminated preserving the two to one relationship between those sheets which have a positive angle, to those which have a negative angle. Where this not done the pitch flap coupling characteristic of the invention would be altered. The primary reason for reducing the number of fibers with the span of the flexure is so the pitch motion will take place at an innermost position along the span of the flexure.

While the present invention has been illustrated and disclosed with reference to preferred embodiments, it is to be understood that various changes and modifications may be made to the invention as disclosed without departing from the spirit of the invention.

I claim:

1. A composite structure flexure having a longitudinal centerline for connecting a rotor blade having a chord line to a rotor hub in a bearingless rotor assembly, wherein the composite structure comprises fibers held together by a bonding agent, wherein reference Cartesian coordinates for said flexure are chosen such that an X axis is parallel to the longitudinal centerline of the flexure, a Y axis is parallel to the chord line of the blade, and a Z axis is perpendicular to the X and Y axes, wherein a plurality of said fibers are bonded in parallel co-planer relation in the XY plane to form a sheet, a plurality of said sheets comprising first, second, and third sets being bonded together in layers to form said flexure, the fibers of said first set oriented to form a positive angle with the X axis, the fibers of said second set oriented to form a negative angle with the X axis, the fibers of the third set being parallel to the X axis, whereby the resultant flexure allows limited three degrees of freedom of motiong of the blade to permit flap, pitch, and leadlag motion of the blade while inherently inducing a change in pitch angle of the blade in response to a change in flap angle of the blade.

2. The flexure of claim 1 wherein a positive change in flap angle produces a negative change in pitch angle.

3. The flexure of claim 2 wherein the number of fibers in the first set is greater than the number of fibers in the second set.

4. The flexure of claim 1 wherein the number of fibers in the first set is twice the number of fibers in the second set, and wherein the magnitude of said positive and negative angles is 45°.

* * * * *